United States Patent [19]
Hsich

[11] Patent Number: 6,039,085
[45] Date of Patent: Mar. 21, 2000

[54] MULTI-LAYER TUBING ASSEMBLY WITH FOAMED OUTER LAYER

[75] Inventor: Henry S. Hsich, Rochester Hills, Mich.

[73] Assignee: Bundy Corporation, Warren, Mich.

[21] Appl. No.: 09/314,809

[22] Filed: May 19, 1999

Related U.S. Application Data

[63] Continuation-in-part of application No. 08/593,068, Jan. 29, 1996, Pat. No. 5,934,336.
[51] Int. Cl.⁷ ....................................................... F16L 11/04
[52] U.S. Cl. ........................... 138/137; 138/141; 138/140; 138/DIG. 1
[58] Field of Search .................................... 138/137, 141, 138/140, DIG. 1, DIG. 3, DIG. 7

[56] References Cited

U.S. PATENT DOCUMENTS

| | | | |
|---|---|---|---|
| 3,070,132 | 12/1962 | Sheridan | 138/103 |
| 3,166,688 | 1/1965 | Rowand et al. | 138/103 X |
| 3,473,087 | 10/1969 | Slade | 138/103 |
| 3,561,493 | 2/1971 | Maillard | 138/141 |
| 3,907,955 | 9/1975 | Viennot | 264/105 |
| 4,643,927 | 2/1987 | Luecke et al. | 428/36 |
| 4,706,713 | 11/1987 | Sadamitsu et al. | 138/137 |
| 4,887,647 | 12/1989 | Igarashi et al. | 138/126 |
| 5,038,833 | 8/1991 | Brunnhofer | 138/137 |
| 5,076,329 | 12/1991 | Brunnhofer | 138/137 |
| 5,142,782 | 9/1992 | Martucci | 138/125 X |
| 5,170,011 | 12/1992 | Martucci | 138/118 X |
| 5,284,184 | 2/1994 | Noone et al. | 138/121 |
| 5,383,087 | 1/1995 | Noone et al. | 138/137 |
| 5,419,374 | 5/1995 | Nawrot et al. | 138/137 |
| 5,460,771 | 10/1995 | Mitchell et al. | 264/508 |
| 5,469,892 | 11/1995 | Noone et al. | 138/121 |
| 5,524,673 | 6/1996 | Noone et al. | 138/137 X |
| 5,554,425 | 9/1996 | Krause et al. | 138/137 X |
| 5,566,720 | 10/1996 | Cheney et al. | 138/137 |
| 5,653,266 | 8/1997 | Reynolds | 138/137 |

FOREIGN PATENT DOCUMENTS

| | | |
|---|---|---|
| 0551094 | 7/1993 | European Pat. Off. . |
| WO9321466 | 10/1993 | WIPO . |
| WO9325835 | 12/1993 | WIPO . |
| WO9409303 | 4/1994 | WIPO . |
| WO9523036 | 8/1995 | WIPO . |

OTHER PUBLICATIONS

Henry S. Hsich, "Morphology and Property Control via Phase Separation or Phase Dissolution During Cure in Multiphase Systems", pp. 186–203, 1990, Advances in Polymer Technology, vol. 10, No. 3.

Thermodynamically reversible and irreversible Control on Morphology of Multiphase Systems, Journal of Materials Science 25, Chapman and Hall, Ltd., 1990.

Phase separation mechanism of rubber–modified epoxy, Journal of Materials Science 25, 1990.

Morphology and Properties Control on Rubber–Epoxy Alloy Systems, Polymer Engineering and Science, May 1990.

Phase Diagrams of Rubber–Modified Epoxies by Rayleigh–Brillouin Scattering and Thermodynamically Reversible and Irreversible Control on Morphology of Multiphase Systems, 34th International SAMPE Symposium, May 1989.

*Primary Examiner*—Patrick Brinson
*Attorney, Agent, or Firm*—Dorn, McEachran, Jambor & Keating

[57] ABSTRACT

A multi-layer tubing for use in fluid transport applications. The tubing is suitable for conveying fluids containing hydrocarbons. The tubing comprises an extrudable adhesive layer of multi-phase polymer blends or alloys which is coextruded around a permeation-resistant layer of fluoropolymer. An outer layer of foamed polyamide is coextruded around the adhesive layer. The adhesive layer of polymer blends or alloys has a multi-phase morphology wherein one phase is miscible with the fluoropolymer for forming the permeation-resistant layer and another phase is miscible with the polyamide for forming the foamed outer layer.

26 Claims, No Drawings

MULTI-LAYER TUBING ASSEMBLY WITH FOAMED OUTER LAYER

This application is a continuation-in-part of application Ser. No. 08/593,068, filed on Jan. 29, 1996 now U.S. Pat. No. 5,934,336.

BACKGROUND OF THE INVENTION

The present invention relates to multi-layer tubing for fluid and vapor handling systems. More specifically, it relates to coextruded multi-layer tubing assemblies for use in automotive fuel line applications having one or more inner layers of fluoropolymer, a middle adhesive layer and an outer foamed polyamide layer.

Tubing assemblies for the transport of liquids and vapors are well known in the art. In fuel-line applications, tubing assemblies are exposed to a variety of deleterious and harmful conditions. The tubing is in nearly constant contact with fuel and other automotive fluids and additives. Also, there are external environmental factors such as stone impact and corrosive media (such as salt) to consider. Furthermore, engine temperatures often rise to extremely high levels, and in cold climates, there is exposure to extremely low temperatures as well.

This abundance of considerations has led to design of tubing having multiple layers. The materials of each layer have specific, and preferably complementary properties. Inner tubing layers, for example, are typically designed to be resistant to permeation by liquids and gases, while outer layers possess mechanical strength and shock resistance.

The art contains numerous examples of multi-layer tubing assemblies. U.S. Pat. No. 3,561,493 to Maillard discloses tubing having two coextruded layers of different plastics, and a coextruded layer of adhesive therebetween. The layers are chosen from plastics having complementary properties. U.S. Pat. No. 4,643,927 to Luecke et al. discloses tubing having a central barrier layer of polyvinylidene chloride that is relatively gas impermeable. The barrier layer is surrounded by inner and outer adhesive layers which in turn are surrounded by inner and outer surface layers of polyethylene that protect the central barrier layer from degradation. U.S. Pat. No. 4,887,647 to Igarishi et al. shows multi-layer tubing having an inner fluororubber layer that prevents degradation due to amine-type additives and also exhibits improved adhesion to an outside rubber layer. U.S. Pat. No. 5,038,833 to Brunnhofer discloses tubing having a protective outer polyamide layer, a middle alcohol barrier layer of polyvinyl-alcohol, and an inner water barrier layer of polyamide. U.S. Pat. No. 5,076,329 to Brunnhofer shows a five-layer tubing assembly having outer, inner and middle layers of nylon, and intermediate bonding and solvent-blocking layers.

Another requirement for fuel lines is provision for discharge of internal static electricity. Accumulated, undissipated electric charge can eventually cause a breach in a fuel line. U.S. Pat. Nos. 3,166,688 to Rowand et al. and 3,473,087 to Slade disclose polytetrafluoroethylene (PTFE) tubing assemblies having electrically conductive inner layers to facilitate dissipation of static electrical energy.

More recent developments in multi-layer tubing design have been motivated by governmental regulations limiting permissible hydrocarbon emissions. It is known that fluoropolymers exhibit good permeation resistance to hydrocarbon fuels. Hence, recent multi-layer tubing assemblies have usually included at least one permeation-resistant fluoropolymer layer. Difficulties have been encountered, however, in finding a commercially viable design. Most fluoropolymers having strong mechanical properties, for example, do not bond well with other fluoropolymers. Conversely, fluoropolymers exhibiting good bondability (polyvinylidene fluoride (PVDF), in particular) tend to be mechanically weak.

U.S. Pat. No. 5,383,087 to Noone et al. is a recent example. It includes an outer impact-resistant polyamide layer, an intermediate bonding layer, an inner permeation-resistant fluoroplastic layer, and an innermost conductive fluoroplastic layer for dissipation of electrostatic charge. All layers are coextruded. The innermost conductive layer exhibits an exceptional electrostatic dissipation capacity in the range of $10^{-4}$ to $10^{-9}$ ohm/cm$^2$. Materials possessing such extremely high conductivity, however, are typically metallic or brittle plastic. Consequently, they are difficult to extrude and also exhibit poor mechanical properties. Furthermore, most of the fluoropolymers disclosed in the '087 patent bond poorly with dissimilar polymers.

The fluoropolymer bonding problem is addressed in U.S. Pat. No. 5,419,374 to Nawrot et al. Nawrot et al. disclose multi-layer coextruded tubing having an outer layer of polyamide 12, an inner PVDF layer, and a middle adhesion binder layer (a mixture of polyurethane and ethylene/vinyl acetate copolymer). Though, as discussed above, PVDF demonstrates better adhesion to the polyamide layer, PVDF multi-layer tubing suffers from poor cold impact-resistance. This is due to the fact that PVDF becomes brittle at low temperatures.

Other high performance fluoropolymers, such as ethylene tetrafluoroethylene (ETFE), exhibit better cold impact-resistance but again, have experienced bonding problems. One approach in the art has been to pretreat the ETFE surface using methods such as chemical etching, plasma discharge or corona discharge. European Patent Application publication No. 0 551 094, for example, discloses a multi-layer tubing assembly in which an inner ETFE layer is treated by corona discharge to enhance bonding to an outer polyamide layer. Similarly, PCT international application WO 95/23036 treats an inner ETFE layer with plasma discharge to achieve better bonding with an outer thermosetting elastomer layer. In the same vein, U.S. Pat. No. 5,170,011 etches a fluorocarbon inner layer to promote better bonding with a polyamide outer layer. These approaches, too, have their problems. Pretreatment processes such as corona and plasma discharge are expensive and can be environmentally hazardous. Furthermore, in many cases (such as with corona treatment), only temporary bonding is achieved and delamination may occur with aging.

SUMMARY OF THE INVENTION

The present invention provides a coextruded multi-layer tubing assembly having an extruded inner permeation-resistant layer of fluoropolymer, an adhesive layer co-extruded around the inner layer and an outer layer of foamed polyamide coextruded around the adhesive layer. The adhesive layer is comprised of a polymer alloy having a multi-phase morphology wherein one phase in miscible with fluoropolymer and another phase is miscible with polyamide.

DETAILED DESCRIPTION OF THE PREFERRED EMBODIMENTS

The present invention provides a coextruded multi-layer tubing assembly having an inner permeation-resistant layer of fluoropolymer, a middle adhesive layer and an outer layer of a polymer chemically dissimilar from fluoropolymer. The adhesive layer is formed of a polymer blend or alloy having a multi-phase morphology wherein one phase is miscible with the fluoropolymer for forming the inner permeation-resistant layer and another phase is miscible with the polymer chemically dissimilar from fluoropolymer for forming the outer layer. The tubing may also have innermost semi-conductive layer of fluoropolymer with a surface resistivity in the range of about $10^2$ to $10^8$ ohm/sq. A semi-conductive layer, rather than a highly conductive layer, provides better mechanical properties and is more suitable for coextrusion.

A first embodiment of the present invention is a four-layer tubing assembly for use in liquid fuel-line applications. It includes an extruded innermost semi-conductive layer of ethylene tetrafluoroethylene (ETFE). The ETFE is made semi-conductive by mixing it with 1% to 10% by weight of conductive carbon black. It has a surface resistivity in the range of about $10^2$ to $10^8$ ohm/sq., with a preferential range of $10^2$ to $10^5$ ohm/sq. An inner permeation-resistant layer of ETFE is coextruded around the innermost layer of semi-conductive layer of ETFE.

An adhesive layer is coextruded around the inner permeation-resistant layer. The adhesive is a polymer blend or alloy that has a multi-phase morphology wherein one phase is compatible or miscible with ETFE, and another phase is compatible or miscible with polyamide. Morphology development and mechanisms of phase separation in polymer alloys and blends is known and is described in the inventor's prior art publication, "Morphology and Property Control via Phase Separation or Phase Dissolution during Cure in Multiphase Systems", Advances in Polymer Technology, Vol. 10, No. 3, pp. 185–203 (1990). Use of an adhesive of polymer blends and alloys having multi-phase morphology is also described in the inventor's prior art publications, H. S. -Y. Hsich, Proc. 34$^{th}$ Int. SAMPE Symp., 884 (1989), H. S. -Y. Hsich, J Mater. Sci., 25, 1568 (1990), H. S. -Y. Hsich, Polym. Eng. Sci., 30, 493 (1990).

An outer layer of polyamide is coextruded around the adhesive layer. The polyamide could be nylon 12, nylon 6, or a sublayer of nylon 6 and a cover layer of nylon 12.

A second embodiment of the present invention is a three-layer tubing assembly for use in liquid fuel-line applications. It includes an extruded inner semi-conductive and permeation-resistant layer of soft ETFE. The ETFE is made semi-conductive by mixing it with 1% to 6% by weight of conductive carbon black. It has a surface resistivity in the range of about $10^2$ to $10^8$ ohm/sq., with a preferential range of $10^3$ to $10^5$ ohm/sq.

An adhesive layer is coextruded around the inner permeation-resistant layer. The adhesive, as in the first embodiment, is a polymer blend or alloy that has a multi-phase morphology wherein one phase is compatible or miscible with ETFE, and another phase is compatible or miscible with polyamide. An outer layer of polyamide is coextruded around the adhesive layer. The polyamide could be nylon 12, nylon 6, or a sublayer of nylon 6 and a cover layer of nylon 12.

A third embodiment of the present invention is a three-layer tubing assembly for use in vapor fuel-line applications. It includes an extruded inner permeation-resistant layer of soft ETFE. An adhesive layer is coextruded around the inner permeation-resistant layer. The adhesive, as in the first and second embodiments, is a polymer blend or alloy that has a multi-phase morphology wherein one phase is compatible or miscible with ETFE, and another phase is compatible or miscible with polyamide. An outer layer of polyamide is coextruded around the adhesive layer. The polyamide could be nylon 12, nylon 6, or a sublayer of nylon 6 and a cover layer of nylon 12.

While the first three embodiments disclose the inner permeation-resistant layer formed of ETFE as the preferred fluoropolymer, it should be noted that bonding other types of fluoropolymer to polyamides are also particularly difficult with the use of an adhesive that has a single phase. Therefore, a polymer blend or alloy that has a multi-phase morphology wherein one phase is compatible or miscible with the fluoropolymer and another phase compatible or miscible with the polyamide, can also be used for bonding an outer layer of polyamide and an inner layer of fluoropolymer other than ETFE.

A fourth embodiment of the present invention is a four-layer tubing assembly for use in liquid fuel-line applications. It includes an extruded innermost semi-conductive layer of fluoropolymer. The fluoropolymer is made semi-conductive by mixing it with 1% to 10% by weight of conductive carbon black. It has a surface resistivity in the range of about $10^2$ to $10^8$ ohm/sq., with a preferential range of $10^2$ to $10^5$ ohm/sq. An inner permeation-resistant layer of fluoropolymer is coextruded around the innermost layer of semi-conductive layer of fluoropolymer. The fluoropolymer for forming the semi-conductive layer may be the same type of fluoropolymer for forming the inner permeation-resistant layer. Alternatively the fluoropolymer for forming the semi-conductive layer may be of a different type of fluoropolymer for forming the inner permeation-resistant layer.

An adhesive layer is coextruded around the inner permeation-resistant layer. The adhesive is a polymer blend or alloy that has a multi-phase morphology wherein one phase is compatible or miscible with the fluoropolymer for forming the inner permeation-resistant layer and another phase is compatible or miscible with polyamide.

An outer layer of foamed polyamide is coextruded around the adhesive layer. The foamed polyamide offers the tubing assembly the same degree of strengths as a non-foamed polyamide, yet the usage of foamed polyamide for forming the outer layer significantly reduces the weight of the tubing compared to the non-foamed polyamide. The reduction in weight is due to the presence of void spaces in the polyamide formed during the foaming process.

The polyamide could be nylon 12, nylon 6 or nylon 46. The foaming of the polyamide is caused by the addition of a blowing agent into the polyamide. Examples of such blowing agents include but are not limited to azodicarbonamides, hydrazine derivatives, semi-carbazides, tetrazoles, benzoxazines and mixtures thereof. The blowing agent is mixed with the polyamide just prior to the extrusion process. Following the extrusion of the outer-layer, the blowing agent will cause the polyamide to expand or foam, hence creating void spaces within the outer layer.

A fifth embodiment of the present invention is a three-layer tubing assembly for use in liquid fuel-line applications. It includes an extruded inner semi-conductive and permeation-resistant layer of soft fluoropolymer. The fluoropolymer is made semi-conductive by mixing it with 1% to 6% by weight of conductive carbon black. It has a surface resistivity in the range of about $10^2$ to $10^8$ ohm/sq., with a preferential range of $10^3$ to $10^5$ ohm/sq.

An adhesive layer is coextruded around the inner semi-conductive and permeation-resistant layer. The adhesive is a polymer blend or alloy that has a multi-phase morphology wherein one phase is compatible or miscible with fluoropolymer, and another phase is compatible or miscible with polyamide. An outer layer of foamed polyamide is coextruded around the adhesive layer. The polyamide could be nylon 12, nylon 6 or nylon 46. The foaming of the polyamide for this embodiment is the same as the foaming of the polyamide for the fourth embodiment.

A sixth embodiment of the present invention is a three-layer tubing assembly for use in vapor fuel-line applications. It includes an extruded inner permeation-resistant layer of soft fluoropolymer. An adhesive layer is coextruded around the inner permeation-resistant layer. The adhesive is a polymer blend or alloy that has a multi-phase morphology wherein one phase is compatible or miscible with fluoropolymer, and another phase is compatible or miscible with polyamide. An outer layer of foamed polyamide is coextruded around the adhesive layer. The polyamide could be nylon 12, nylon 6 or nylon 46. The foaming of the polyamide for this embodiment is the same as the foaming of the polyamide for the fourth embodiment.

A seventh embodiment of the present invention is a four-layer tubing assembly for use in vapor fuel-line applications. It includes an extruded inner permeation-resistant layer of soft fluoropolymer. An adhesive layer is coextruded around the inner permeation-resistant layer. The adhesive is a polymer blend or alloy that has a multi-phase morphology wherein one phase is compatible or miscible with fluoropolymer, and another phase is compatible or miscible with polyamide. A layer of polyamide is coextruded around the adhesive layer. A layer of foamed polyamide is coextruded around the polyamide. The polyamide for forming the layer of polyamide and the layer of foamed polyamide could be nylon 12, nylon 6 or nylon 46. The types of polyamides for forming the layers of polyamide and foamed polyamide may the same or different. The foaming of the polyamide of the outer layer for this embodiment is the same as the foaming of the polyamide for the fourth embodiment.

An eighth embodiment of the present invention is a four-layer tubing assembly for use in vapor fuel-line applications. It includes an extruded inner semi-conductive and permeation-resistant layer of soft fluoropolymer. The fluoropolymer is made semi-conductive by mixing it with 1% to 6% by weight of conductive carbon black. It has a surface resistivity in the range of about $10^2$ to $10^8$ ohm/sq., with a preferential range of $10^3$ to $10^5$ ohm/sq.

An adhesive layer is coextruded around the inner semi-conductive and permeation-resistant layer. The adhesive is a polymer blend or alloy that has a multi-phase morphology wherein one phase is compatible or miscible with fluoropolymer, and another phase is compatible or miscible with polyamide. A layer of polyamide is coextruded around the adhesive layer. A layer of foamed polyamide is coextruded around the polyamide. The polyamide for forming the layer of polyamide and the layer of foamed polyamide could be nylon 12, nylon 6 or nylon 46. The types of polyamides for forming the layers of polyamide and foamed polyamide may the same or different. The foaming of the polyamide of the outer layer for this embodiment is the same as the foaming of the polyamide for the fourth embodiment.

A ninth embodiment of the present invention is a five-layer tubing assembly for use in vapor fuel-line applications. It includes an extruded inner semi-conductive layer of soft fluoropolymer. The fluoropolymer is made semi-conductive by mixing it with 1% to 6% by weight of conductive carbon black. It has a surface resistivity in the range of about $10^2$ to $10^8$ ohm/sq., with a preferential range of $10^3$ to $10^5$ ohm/sq. A layer of inner permeation-resistant layer of soft fluoropolymer is extruded around the inner semi-conductive layer of fluoropolymer. The fluoropolymer for forming the semi-conductive layer may be the same type of fluoropolymer for forming the inner permeation-resistant layer. Alternatively the fluoropolymer for forming the semi-conductive layer may be of a different type of fluoropolymer for forming the inner permeation-resistant layer.

An adhesive layer is coextruded around the permeation-resistant layer. The adhesive is a polymer blend or alloy that has a multi-phase morphology wherein one phase is compatible or miscible with the fluoropolymer for forming the inner permeation-resistant layer and another phase is compatible or miscible with polyamide. A layer of polyamide is coextruded around the adhesive layer. A layer of foamed polyamide is coextruded around the polyamide. The polyamide for forming the layer of polyamide and the layer of foamed polyamide could be nylon 12, nylon 6 or nylon 46. The types of polyamides for forming the layers of polyamide and foamed polyamide may the same or different. The foaming of the polyamide of the outer layer for this embodiment is the same as the foaming of the polyamide for the fourth embodiment.

Various features of the present invention have been described with reference to the nine embodiments. It should be understood that modifications may be made without departing from the spirit and scope of the invention as represented by the following claims.

I claim:

1. A multi-layer tubing assembly comprising:
   an extruded inner permeation-resistant layer of fluoropolymer;
   an adhesive layer co-extruded around said inner layer, said adhesive layer is comprised of a polymer alloy having a multi-phase morphology wherein one phase in miscible with fluoropolymer and another phase is miscible with polyamide; and
   an outer layer of foamed polyamide coextruded around said adhesive layer.

2. A multi-layer tubing assembly as claimed in claim 1 wherein said outer layer of foamed polyamide is formed by mixing blowing agent with polyamide prior to extruding said mixture of blowing agent and polyamide.

3. A multi-layer tubing assembly as claimed in claim 2 wherein said blowing agent is selected from the group consisting of azodicarbonamides, hydrazine derivatives, semi-carbazides, tetrazoles, benzoxazines and mixtures thereof.

4. A multi-layer tubing assembly as claimed in claim 2 wherein said polyamide is selected from the group consisting of nylon 46, nylon 6 and nylon 12.

5. A multi-layer tubing assembly as claimed in claim 1 wherein said inner permeation-resistant layer of fluoropolymer is semi-conductive.

6. A multi-layer tubing assembly as claimed in claim 5 wherein said inner permeation-resistant and semi-conductive layer of fluoropolymer has a surface resistivity in the range of about $10^2$ to $10^8$ ohm/sq.

7. A multi-layer tubing assembly as claimed in claim 5 wherein said inner permeation-resistant and semi-conductive layer of fluoropolymer comprises 1% to 10% by weight of conductive carbon black.

8. A multi-layer tubing assembly comprising:
   an extruded inner permeation-resistant layer of fluoropolymer;
   an adhesive layer co-extruded around said inner layer, said adhesive layer is comprised of a polymer alloy having a multi-phase morphology wherein one phase in miscible with fluoropolymer and another phase is miscible with polyamide;

an polyamide layer coextruded around said adhesive layer; and an outer layer of foamed polyamide coextruded around said polyamide layer.

9. A multi-layer tubing assembly as claimed in claim 8 wherein said outer layer of foamed polyamide is formed by mixing blowing agent with polyamide prior to extruding said mixture of blowing agent and polyamide.

10. A multi-layer tubing assembly as claimed in claim 9 wherein said blowing agent is selected from the group consisting of azodicarbonamides, hydrazine derivatives, semi-carbazides, tetrazoles, benzoxazines and mixtures thereof.

11. A multi-layer tubing assembly as claimed in claim 9 wherein said polyamide is selected from the group consisting of nylon 46, nylon 6 and nylon 12.

12. A multi-layer tubing assembly as claimed in claim 8 wherein said inner permeation-resistant layer of fluoropolymer is semi-conductive.

13. A multi-layer tubing assembly as claimed in claim 12 wherein said inner permeation-resistant and semi-conductive layer of fluoropolymer has a surface resistivity in the range of about $10^2$ to $10^8$ ohm/sq.

14. A multi-layer tubing assembly as claimed in claim 12 wherein said inner permeation-resistant and semi-conductive layer of fluoropolymer comprises 1% to 10% by weight of conductive carbon black.

15. A multi-layer tubing assembly comprising:

an extruded innermost semi-conductive layer of fluoropolymer;

an inner permeation-resistant layer of fluoropolymer coextruded around said innermost layer;

an adhesive layer co-extruded around said inner layer, said adhesive layer is comprised of a polymer alloy having a multi-phase morphology wherein one phase in miscible with fluoropolymer and another phase is miscible with polyamide; and an outer layer of foamed polyamide coextruded around said adhesive layer.

16. A multi-layer tubing assembly as claimed in claim 15 wherein said outer layer of foamed polyamide is formed by mixing blowing agent with polyamide prior to extruding said mixture of blowing agent and polyamide.

17. A multi-layer tubing assembly as claimed in claim 16 wherein said blowing agent is selected from the group consisting of azodicarbonamides, hydrazine derivatives, semi-carbazides, tetrazoles, benzoxazines and mixtures thereof.

18. A multi-layer tubing assembly as claimed in claim 16 wherein said polyamide is selected from the group consisting of nylon 46, nylon 6 and nylon 12.

19. A multi-layer tubing assembly as claimed in claim 15 wherein said innermost semi-conductive layer of fluoropolymer has a surface resistivity in the range of about $10^2$ to $10^8$ ohm/sq.

20. A multi-layer tubing assembly as claimed in claim 15 wherein said innermost semi-conductive layer of fluoropolymer comprises 1% to 10% by weight of conductive carbon black.

21. A multi-layer tubing assembly comprising:

an extruded innermost semi-conductive layer of fluoropolymer;

an inner permeation-resistant layer of fluoropolymer coextruded around said innermost layer;

an adhesive layer co-extruded around said inner layer, said adhesive layer is comprised of a polymer alloy having a multi-phase morphology wherein one phase in miscible with fluoropolymer and another phase is miscible with polyamide;

an polyamide layer coextruded around said adhesive layer; and an outer layer of foamed polyamide coextruded around said polyamide layer.

22. A multi-layer tubing assembly as claimed in claim 21 wherein said outer layer of foamed polyamide is formed by mixing blowing agent with polyamide prior to extruding said mixture of blowing agent and polyamide.

23. A multi-layer tubing assembly as claimed in claim 22 wherein said blowing agent is selected from the group consisting of azodicarbonamides, hydrazine derivatives, semi-carbazides, tetrazoles, benzoxazines and mixtures thereof.

24. A multi-layer tubing assembly as claimed in claim 22 wherein said polyamide is selected from the group consisting of nylon 46, nylon 6 and nylon 12.

25. A multi-layer tubing assembly as claimed in claim 21 wherein said innermost semi-conductive layer of fluoropolymer has a surface resistivity in the range of about $10^2$ to $10^8$ ohm/sq.

26. A multi-layer tubing assembly as claimed in claim 21 wherein said innermost semi-conductive layer of fluoropolymer comprises 1% to 10% by weight of conductive carbon black.

* * * * *